United States Patent [19]
Kostreski et al.

[11] Patent Number: 5,635,979
[45] Date of Patent: Jun. 3, 1997

[54] DYNAMICALLY PROGRAMMABLE DIGITAL ENTERTAINMENT TERMINAL USING DOWNLOADED SOFTWARE TO CONTROL BROADBAND DATA OPERATIONS

[75] Inventors: Bruce Kostreski, Wheaton; Eugene L. Lew, Olney; Henry G. Hudson, Jr., Annapolis, all of Md.; Daniel O'Callaghan, Fairfax Station, Va.

[73] Assignee: Bell Atlantic, Arlington, Va.

[21] Appl. No.: 250,791

[22] Filed: May 27, 1994

[51] Int. Cl.[6] .............................. H04N 7/173; H04N 7/18
[52] U.S. Cl. .................................. 348/13; 348/12; 348/10; 455/4.2; 455/6.3; 364/976.3
[58] Field of Search .................... 348/6, 7, 10, 12, 348/13; 455/4.1, 4.2, 5.1, 6.3, 6.1; 364/976.3, 974, 974.2; 379/105, 88, 93, 96; H04N 7/00, 7/173, 7/18, 7/14, 7/15, 7/16

[56] References Cited

U.S. PATENT DOCUMENTS

| | | | |
|---|---|---|---|
| 4,506,387 | 3/1985 | Walter | 359/118 |
| 4,527,194 | 7/1985 | Sirazi | 348/11 |
| 4,623,905 | 11/1986 | Ichihashi et al. | 347/86 |
| 4,623,920 | 11/1986 | Dufresne et al. | 380/20 |
| 4,677,685 | 6/1987 | Kurisu | 455/4 |
| 4,706,121 | 11/1987 | Young | 348/27 |
| 4,709,418 | 11/1987 | Fox et al. | 348/12 |
| 4,712,239 | 12/1987 | Frezza et al. | 380/20 |
| 4,816,905 | 3/1989 | Tweedy et al. | 348/7 |
| 4,829,372 | 5/1989 | McCalley et al. | 348/7 |
| 4,894,714 | 1/1990 | Christis | 348/10 |
| 4,912,552 | 3/1990 | Allison, III et al. | 348/13 |
| 4,949,187 | 8/1990 | Cohen | 348/10 |
| 4,963,995 | 10/1990 | Lang | 348/384 |
| 4,982,430 | 1/1991 | Frezza et al. | 455/5 |
| 5,010,499 | 4/1991 | Yee | 348/552 |
| 5,014,125 | 5/1991 | Pocock et al. | 348/7 |
| 5,027,400 | 6/1991 | Baji et al. | 348/10 |
| 5,051,822 | 9/1991 | Rhoades | 348/3 |
| 5,057,932 | 10/1991 | Lang | 348/384 |
| 5,119,188 | 6/1992 | McCalley et al. | 348/6 |
| 5,121,476 | 6/1992 | Yee | 348/10 |
| 5,130,792 | 7/1992 | Tindell et al. | 348/7 |

(List continued on next page.)

FOREIGN PATENT DOCUMENTS

| | | | |
|---|---|---|---|
| 3149992 | 6/1991 | Japan | H04N 7/00 |
| WO 94/23537 | 10/1994 | WIPO | H04N 7/173 |

OTHER PUBLICATIONS

A.D. Gelman, "A Store-and-Forward Architecture for Video-on-Demand Service", IEEE Conference, Jun. 23-26, 1991, Denver, Colorado, Communications: Rising to the Heights, vol. 2 of 3, 23 Jun. 1991.

Primary Examiner—John K. Peng
Assistant Examiner—Nathan J. Flynn
Attorney, Agent, or Firm—Lowe, Price, LeBlanc & Becker

[57] ABSTRACT

Dynamic programming of a digital entertainment terminal (DET) facilitates operation of the terminal to offer a variety of functionally different broadband services. The terminal can be reprogrammed, as-needed, for each different service offered by one or more information service providers. The terminal includes a network interface module which couples the terminal to a specific type of communication network for receiving a digital broadband channel and providing two-way control signaling communication between the terminal and the network. The terminal also includes a control processor with a program memory. The control processor receives user inputs and controls operations of the terminal and sending and receiving of control signals over the two-way control signaling channel. The program memory stores data received over the digital broadband channel as software executable by the control processor. The audio/video processor converts compressed, digital information received over the broadband channel into signals for driving an audio/video display device, such as a standard television set. The control processor executes the software received and stored in the memory to control subsequent operations of the terminal, including at least some operations of the audio/video processor and at least some responses to user inputs.

34 Claims, 3 Drawing Sheets

U.S. PATENT DOCUMENTS

| | | | |
|---|---|---|---|
| 5,132,992 | 7/1992 | Yurt et al. | 455/5.1 |
| 5,133,079 | 7/1992 | Ballantyne et al. | 348/10 |
| 5,136,411 | 8/1992 | Paik et al. | 346/49 |
| 5,142,680 | 8/1992 | Ottman et al. | 395/700 |
| 5,166,886 | 11/1992 | Molnar et al. | 364/479 |
| 5,181,107 | 1/1993 | Rhoades | 348/13 |
| 5,189,673 | 2/1993 | Burton et al. | 370/110.1 |
| 5,192,999 | 3/1993 | Graczyk et al. | 348/552 |
| 5,231,494 | 7/1993 | Wachob | 348/10 |
| 5,247,347 | 9/1993 | Litteral et al. | 348/7 |
| 5,249,044 | 9/1993 | Von Kohorn | 348/12 |
| 5,253,275 | 10/1993 | Yurt et al. | 455/5.1 |
| 5,335,277 | 8/1994 | Harvey et al. | 380/20 |
| 5,373,288 | 12/1994 | Blahut | 340/825.08 |
| 5,379,421 | 1/1995 | Palazzi, III et al. | 348/13 |
| 5,410,326 | 4/1995 | Goldstein | 348/134 |
| 5,421,017 | 5/1995 | Scholz et al. | 395/700 |
| 5,440,632 | 8/1995 | Bacon et al. | 348/3 |
| 5,442,389 | 8/1995 | Blahut et al. | 348/7 |

DYNAMICALLY PROGRAMMABLE DIGITAL ENTERTAINMENT TERMINAL USING DOWNLOADED SOFTWARE TO CONTROL BROADBAND DATA OPERATIONS

TECHNICAL FIELD

The present invention relates to a programmable digital entertainment terminal (DET) for use in digital video program distribution networks and to systems and methods for dynamically programming such a terminal to offer a variety of functionally different broadband services.

BACKGROUND ART

Set top terminal devices commonly in use in cable television systems today have a number of limitations. First, the devices are limited to processing of analog television signals. Also, cable television terminal devices are generally "dumb" devices having a limited set of functionalities constrained by the hard wired programming of the internal micro-processor controlled device. Essentially all cable television terminal devices respond to a selection input from the subscriber, tune to a selected channel available on the cable television network, decode the video program material if scrambled, and provide output signals compatible with a standard television receiver.

Enhanced cable television terminals do provide some additional features, such as graphics overlay capability and two way communication of control signalling to and from headend terminal devices. Although such improved terminals facilitate some enhanced services, such as home shopping and purchasing, the performance of these cable television set top terminals is still limited to analog decoding. Also the range of services is still limited by the hard wired capabilities of the microprocessor within the set-top terminal devices.

Proposals have been made to download computer executable code over cable television networks. In particular, U.S. Pat. Nos. 5,051,822 and 5,181,107 both to Rhoades disclose a terminal device connectable to a cable television network and a telephone line. A subscriber requests a video game or other software stored in a remotely located software storage center by operating the terminal to establish a bi-directional telephone link with the remote storage center. The center transmits the encoded software program together with the terminal identification code as a digital bit stream over a television broadcast channel. The terminal requesting the software monitors all digital bit streams on the broadcast channel but receives only the software program addressed to it, i.e. only after identification code validation occurs. Once reception of all the software data is complete, the terminal acknowledges receipt to the remote storage center and drops the telephone line. The encoded software program is decoded, and the terminal provides a display informing the subscriber that the game or other program is ready for use. The terminal also offers the subscriber the means to interact with the software, e.g. play the game, using contemporary gaming control or input devices. While the Rhoades terminal structure does provide enhanced capabilities, such as video games and home shopping, the display functionality controlled by the downloaded software is limited to computer displays generated in response to the software, there is no direct interaction of the received software with any video program carried on the cable network. The downloaded software does not control further instructions with the storage center. Also, the video transmissions on the cable system are analog, and a separate telephone connection is required for selection inputs to the central storage facility. Furthermore, the terminal device apparently can receive software from the storage center of only one service provider.

Some prior art systems do permit downloading into the cable television decoder itself, however, it is believed that this downloading of information into decoder has been limited to information controlling the decoding of the television program signals, e.g. a key word used in a descrambling algorithm. Dufresne et al., in U.S. Pat. No. 4,623,920, teach a specific scheme for addressing data transmissions over a cable television network to groups of terminals or to individual terminals. The addressed data sent from the head end can include an option table of signals for controlling descrambling of available television programs, data to enable operation of a cable TV converter, or software for operating a peripheral microcomputer separate from the cable television terminal device. The Dufresne et al. terminal is limited to reception of data from only one service provider, i.e. the provider operating the cable TV network. Also, the services provided through the terminal are limited in that the downloaded data apparently does not alter or control the terminal functionality for further interactions with the provider through the network.

Recently, several different wideband digital distribution networks have been proposed for offering subscribers an array of video services, such as Video On Demand. The following U.S. Patents disclose representative examples of such digital video distributions networks: U.S. Pat. No. 5,253,275 to Yurt et al., U.S. Pat. No. 5,132,992 to Yurt et al., U.S. Pat. No. 5,133,079 to Ballantyne et al., U.S. Pat. No. 5,130,792 to Tindell et al., U.S. Pat. No. 5,057,932 to Lang, U.S. Pat. No. 4,963,995 to Lang, U.S. Pat. No. 4,949,187 to Cohen, U.S. Pat. No. 5,027,400 to Baji et al., and U.S. Pat. No. 4,506,387 to Walter. The terminal devices in these digital networks are still limited functionality devices. In these networks, the digital terminal devices still only receive selection inputs, transmit selection signals upstream to the source of the video materials, receive downstream video transmissions, decompress the digitized video materials and convert to analog form, and provide appropriate signals to a television receiver. One example of such a digital video distribution network and the terminal device for such a network, disclosed in Litteral et al. U.S. Pat. No. 5,247,347, will be described in more detail below.

U.S. Pat. No. 5,247,347 to Litteral et al., the disclosure of which is hereby incorporated in its entirety into this disclosure by reference and over which the present invention is an improvement, discloses an enhanced public switched telephone network which also provides a video on demand service to subscribers over the Public switched telephone network. A menu of video programming information is displayed at the subscriber's premises by a set-top terminal and a TV set. The subscriber may transmit ordering information via the Public switched telephone network to the independent video information providers. Video programming may be accessed and transmitted to the subscriber directly from a video information provider (VIP) or through a video buffer located at a central office (CO) serving the subscriber.

Connectivity between the central office and the subscriber for transmission of video data is provided by an asymmetrical digital subscriber line (ADSL) system. ADSL interface units at the central office multiplex digital video information with voice information to be transmitted to the subscriber and support two-way transmission between the subscriber's line and the X.25 packet data network of one or more control channels. A complementary ADSL interface unit at the subscriber's premises separate downstream video control signals and voice telephone signals from the line and multiplex upstream control signals and voice telephone signals onto the line.

A subscriber can request transmission of video data using a telephone instrument by dialing a Voice Response Unit (VRU) of a video gateway device, through the voice telephone switch and dialing in selection information. Alternatively, the user can access the video gateway device and select a video using a remote control device, the set-top terminal and the control signaling channel through the network. The VIP identifies the requested title and determines if the title is available.

If the title is found, the corresponding data file is opened and a reserve idle communications port is identified for transmission of the video data to an input node of a digital cross-connect switch (DCS). The video data file is transmitted from the VIP's video storage device, through the DCS, to the designated ADSL interfaces for transmission to the requesting subscriber's premises. The ADSL interface on the subscriber premises demultiplexes the broadband program transmission off of the subscriber loop and applies the digital data stream to a decoder unit in the set-top terminal. The decoder unit decompresses the audio and video data, and converts the digital audio and video to corresponding analog signals. The decoder can supply baseband analog audio and video signals to a television receiver, or these analog signals can be modulated to a standard television channel frequency for use by the television receiver.

The above detailed discussion of the Litteral et al. system shows that prior art digital distribution networks offer enhanced video services, but the terminal device functionality is still limited to program selection, decoding and display.

A number of suggestions have been made in the press regarding arrays of different services which will become available through broadband digital networks now popularly referred to as the "Information Super Highway". If a different VIP were to offer a different service, the VIP can limit the service to an interactivity with the subscriber essentially corresponding to the functionality available in the terminal device. This approach, however, limits the functional capabilities the new VIP may choose for the different service. Alternatively, the subscriber must buy another terminal device programmed or wired to function in accord with the VIP's new service. This second approach, however, forces the subscriber to purchase and connect up a different terminal device for each different service subscribed to.

From the above discussion it becomes clear that a need exists in the art for set-top terminal devices which process compressed, broadband digital audio video information and are readily adaptable to perform a variety of related functionalities, as needed to facilitate a range of audio/video and interactive services offered by a large number of information providers.

DISCLOSURE OF THE INVENTION

The present invention addresses the above noted needs by providing methods and terminal device structures for dynamically programming the digital audio/video terminal. The terminal can be reprogrammed on an as-needed basis to provide a wide range of services and associated terminal functionalities.

In one aspect, the invention is a digital entertainment terminal. The inventive terminal includes a network interface module. This modules couples the terminal to a communication network for receiving a digital broadband channel and providing two-way control signaling communication between the terminal and the network. The terminal also includes a control processor with a program memory. The control processor controls operations of the terminal and sending and receiving of control signals over the two-way control signaling channel. The program memory stores data received over the digital broadband channel as software executable by the control processor. The terminal further includes means for receiving inputs from a user and providing corresponding signals to the control processor, and an audio/video processor. The audio/video processor is responsive to compressed, digital information received over the broadband channel for producing signals for driving an audio/video display device. The control processor executes the software received and stored in the memory to control subsequent operations of the terminal, including some operations of the audio/video processor and some responses to user inputs.

In the preferred embodiment of the terminal structure, the audio/video processor comprises an audio/video decoder and a graphics overlay controller. The audio/video decoder decompresses compressed, digital information received over the broadband channel to produce a decompressed video signal and a decompressed audio signal. The graphics overlay controller is controlled by the control processor to generate graphic display information. The audio/video processor also includes means for combining the graphic display information with the decompressed video signal. Although other decoders may be used, such as a DIGICIPHER™ decoder, the preferred embodiment of the audio/video decoder comprises an MPEG video decoder, an MPEG audio decoder, and an MPEG demultiplexer for selectively routing MPEG encoded video and audio packets carried on the digital broadband channel to the MPEG video decoder and the MPEG audio decoder, respectively. MPEG (moving picture experts group) is a broad generic standard for video program compression, and MPEG 2 is a second generation compression standard for packetized transport of one or more compressed video program signals in a single stream.

The digital entertainment terminal is dynamically programmed through a broadband communications network using a specific method in accord with another aspect of the present invention. A downstream, broadband, digital communication link is established between a digital entertainment terminal and one service provider. The terminal receives software executable by the control processor from the selected service provider via the downstream, broadband, digital communication link. The received software is stored in a memory within the digital entertainment terminal. During subsequent reception of digitized audio and video information over the downstream, broadband, digital communication link, the control processor retrieves the software from the memory. The processor executes the software to control interactions between the user and the selected service provider and to produce audio/video information outputs to the user responsive to the received digitized audio and video information.

The software downloaded and stored in the terminal may include an application program for providing the user a specific interactive service offered by the one information service provider. Applications programs can take an almost infinite variety of forms to facilitate different services. For example, the applications programs can control the formatting of different types of graphic displays overlaid on video programming for different services and can specify different definitions for input keypad functions. The applications programs can specify security procedures and/or enable operation of associated peripheral devices such as credit card readers.

Thus, the downloading of the application program software has a number of advantages. First, the DET can have a totally different program for different service applications offered through different information service providers. Alternatively, one provider can download applications software for one or more services and subsequently write over all or part of that software to permit a user to access another service, all during an ongoing session with the user. Also, any given provider can change their associated application programming at the source, without having to somehow modify or manually reprogram each DET. Another advantage is that the downloading feature eliminates the need for a large permanent non-volatile memory to store the application program in the DET.

The downloaded software also may include an operating system of the control processor. An operating system includes programming to control internal operations of the control processor, such as those necessary to execute specific types of communications over the network, graphics drivers, etc. The operating system typically allows the DET to run a variety of downloaded applications programs. Loading of an operating system will typically require identification of the provider as a provider granted access to change the operating system. The downloading of the operating system has a number of advantages similar to those derived from downloading the applications programming software. In particular, one or more of the information service providers can update the operating system software periodically, as improvements are developed, without having a technician manually service each terminal. Also, a provider can check a terminal's operating system to determine if operating system modules are compatible with the provider's applications programs, and if not, download compatible modules.

In another aspect, the invention relates to an information distribution system. This comprehensive system comprises a network, selectively providing control signaling links and broadband communications channels, and providing access to a plurality of information service provider systems. Each provider system is capable of receiving control signal inputs via a control signaling link through the network and transmitting broadband digital information via a broadband communication channel through the network. The inventive system also includes a plurality of end user terminal devices, at least one of which generally corresponds to the above discussed programmable digital entertainment terminal. One example of such a system is described in detail below, and alternate embodiments of the network portion of the system are described in a related application incorporated by reference below.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODE FOR CARRYING OUT THE INVENTION

Figure 1:
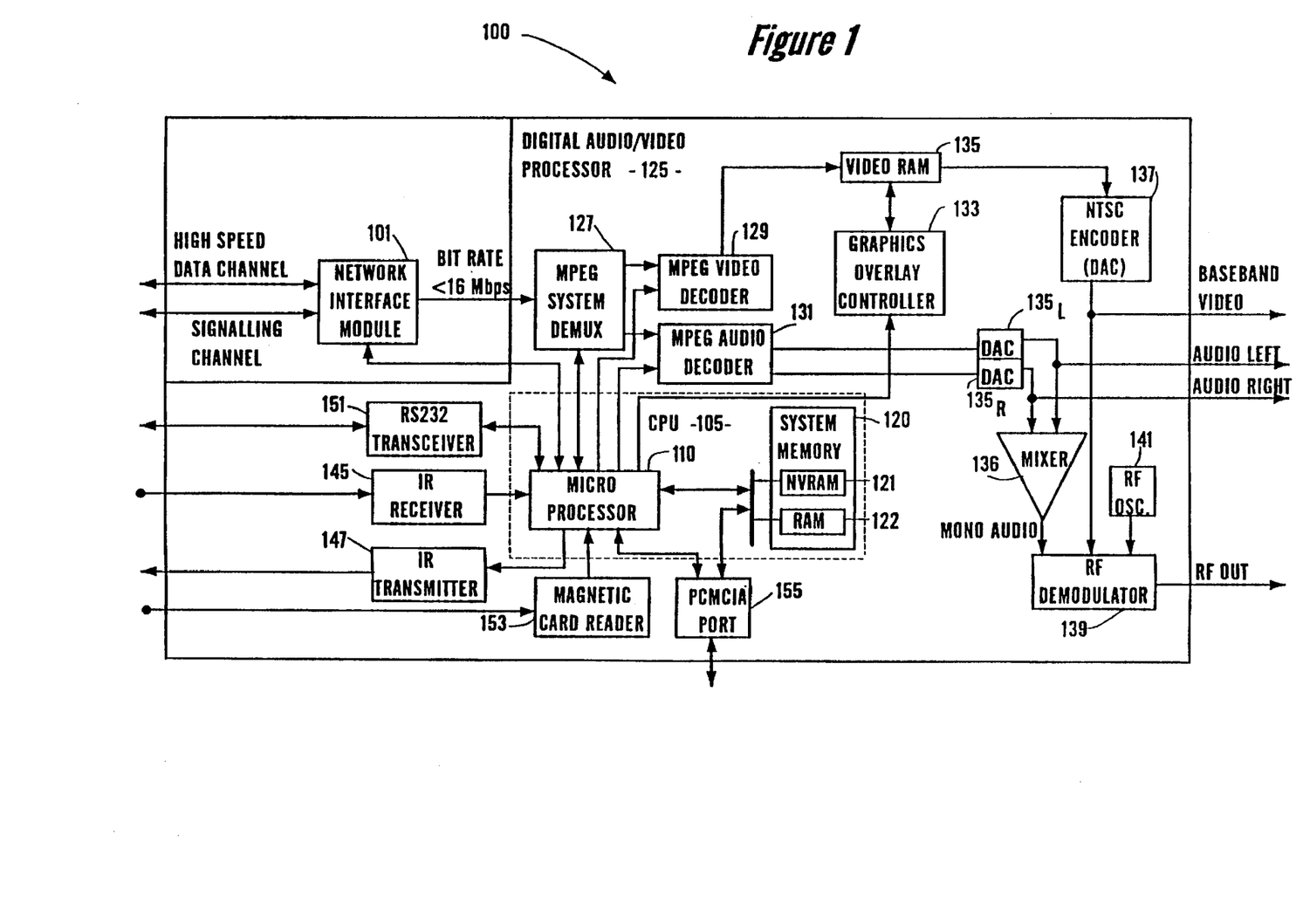
FIG. 1 illustrates a digital entertainment terminal in accord with the present invention.
Figure 3:
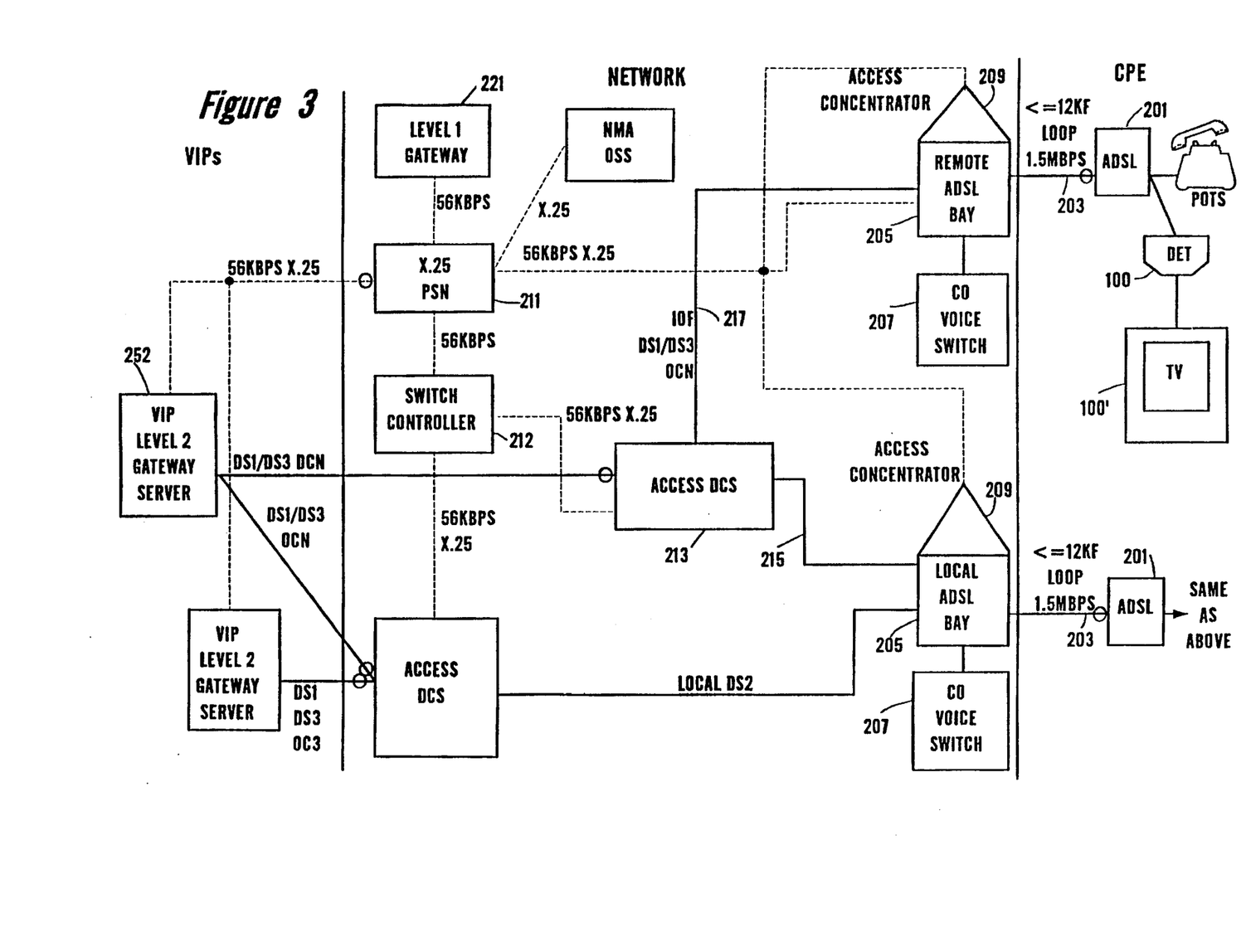
FIG. 3 illustrates one exemplary network configuration with which the inventive digital entertainment terminal may be used.

The DET 100 shown in the FIG. 1 will connect to a number of different types of networks, such as the Video Dial Tone network shown in FIG. 3, and more advanced video distribution networks disclosed in commonly assigned application Ser. No. 08/250,792, filed May 27, 1994, entitled "Full Service Network" (attorney docket no. 680-080), the disclosure of which is incorporated herein entirely by reference. The Video Dial Tone network of FIG. 3 will be discussed in more detail below as a representative example.

For each different type of network, the DET 100 will include a network interface module 101 providing the actual physical connection to the particular type of network. The network interface module 101 will also perform any format conversion necessary between signal formats utilized by the network and signal formats used within the DET 100. For example, in the Full Service Network disclosed in the-cited 08/250,792 application, the network interface module 101 will include means to demodulate received broadband data and convert ATM (Asynchronous Transport Mode) cell stream data into MPEG bit stream data for further processing. The network interface module also provides two-way signal conversion and formatting for at least a control signalling channel.

In the illustrated embodiment, the network interface module 101 presents two connections to the rest of the DET, a high bit rate broadband connection and a low bit rate signaling connection. The broadband connection is a one-way downstream only connection, but the low-bit rate signaling connection is a two-way connection. In the Video Dial Tone Network of FIG. 3, the network interface module would provide corresponding connections to an in home ADSL multiplexer unit. Alternatively, the ADSL unit could be included as one or more additional chips within the DET. In other networks, for example using coaxial cable or optical fiber, the network interface module would include means to multiplex and demultiplex signals for transmission/reception over the coaxial cable or optical fiber. The network interface module would also include the means to physically connect to the particular network. For example, in a fiber to the home network, the module would include a means for two-way conversion between electrical and optical signals and connections to one or more optical fibers for the necessary two-way transmission.

The network interface module 101 takes the form of a plug in module. In the preferred embodiment, the module 101 would be similar to a daughter board or option card which can be plugged into a back plane of a personal computer (PC). In such an embodiment, typically a technician could replace the module in either the field or the shop, to modify a DET to connect to and communicate over a different network, and the technician would modify associated communications control software in the system memory. Alternative implementations may use a user replaceable cartridge type network interface module, similar to a video game cartridge, which may include memory in the module for storage of the communications control. As a further alternative, the network interface module could include a digital signal processor controlled by the CPU of the DET and input/output connections compatible with all of the digital broadband networks currently available. The downloaded operating system software stored in the system memory of the DET would control operations of the digital signal processor to send and receive signals in accord with the particular network the subscriber chooses to connect the DET to.

The DET 100 includes a CPU 105, comprising a 386 or 486 microprocessor 110 and associated system memory 120. The system memory 120 includes at least 2 mbytes of volatile dynamic RAM 122 and 1 mbyte of non-volatile RAM 121. The microprocessor 110 includes a small amount of ROM (not shown) storing "loader" programming needed to control wake-up. An EPROM memory (not shown) also may be added.

A digital audio/video signal processor 125, controlled by the CPU 105, produces digital uncompressed audio and video signals from the audio and video MPEG encoded packets received from the network through the interface module 101. The audio/video processor 125 includes an MPEG system demultiplexer 127, an MPEG video decoder 129, an MPEG audio decoder 131, a graphics overlay controller 133 and at least two frames (e.g. 8 mbytes) of video RAM 135.

The MPEG system demultiplexer circuitry 127 recognizes packets in the MPEG data stream received over the broadband channel through the network interface module 101 and routes the packets to the appropriate components of the DET. For example, the MPEG system demultiplexer 127 circuitry recognizes audio and video packets in the MPEG data stream and routes those packets to the decoders 129, 131, respectively.

The MPEG video decoder 129 decompresses received video packet signals to produce a digital video signal, and the MPEG audio decoder 131 decompresses received audio packets to produce left and right digitized stereo signals. For at least some functions, the MPEG decoders 129, 131 may be controlled in response to signals from the microprocessor 110. The MPEG video decoder 129 will internally include at least two frames (e.g. 8 mbytes) of RAM (not separately shown) for use as a frame reorder buffer during the MPEG video decoding process, and the MPEG audio decoder 131 also may include some buffer memory.

The video RAM 135 is not a specialized "video RAM" as that term is sometimes used in the television art. The RAM 135 is actually a standard digital data RAM, of appropriate size, which is used in the DET to store digitized frames of video data. The RAM within the MPEG video decoder 129 likewise consists of standard digital data RAM.

The graphics display generator produces displays of text and graphics data, such as the initial turn-on selection menu received over the signaling channel, in response to instructions from the CPU 105. The video RAM 135 sequentially receives each frame of digitized, uncompressed video information, as output from the MPEG video decoder 129. The video RAM 135 also receives digital information and read/write control signals from the graphics overlay controller 133 representing the several planes of text and graphics information and combines that information with the frames of decompressed video to produce composite video frames.

The graphics overlay controller 133 and the video RAM 135 actually cooperate to manipulate five different planes of video information, four of which can be active at any one time, to produce the composite video frame output signals. The individual planes comprise the decoded MPEG video frames, a cursor, two graphics/text image planes manipulated by the microprocessor 110 and a backdrop plane. The backdrop plane would be switched in to replace the plane representing the decoded MPEG video frames, e.g. to present a blue background instead of the MPEG video background.

When there are no graphics or text, the composite frames would correspond entirely to the uncompressed received video frames output by the MPEG video decoder 129. When no received video frames are to be output, either when none are received or when they are to be entirely replaced, the information from the graphics overlay generator 133 would specify a background and the active planes of text or graphic information. When received video frames are combined with text and/or graphics, the composite video frames include the uncompressed received video frames with selected pixels thereof replaced with graphics or textual data display pixels specified by the graphics overly controller 133. In this last situation, the graphics overlay controller would deactivate the backdrop plane.

The DET also includes audio and video digital to analog converters and appropriate drivers to produce output signals compatible with a conventional television set. Specifically, the converter and driver circuitry of the DET 100 includes audio digital to analog converters (DAC's) $135_L$, $135_R$, an audio mixer 136, an NTSC encoder 137, and an RF demodulator 139.

The DAC's $135_L$ and $135_R$ receive the uncompressed left and right digitized audio signals output by the MPEG audio decoder 131. In response, the DAC's $135_L$ and $135_R$ produce baseband analog audio signals for output to individual baseband output terminals. The audio mixer 136 also receives the baseband audio signals from the DAC's $135_L$ and $135_R$. The mixer 136 combines the left and right analog audio signals to produce a monaural audio signal as the audio input to RF demodulator 139.

The NTSC encoder 137 also performs a digital to analog converter (DAC) function. In response to the digitized video output signals from the video RAM 135, the NTSC encoder 137 produces a baseband analog video signal in standard NTSC format. The baseband NTSC video signal is supplied to an output terminal of the DET 100. The baseband NTSC video signal is also supplied to the RF demodulator 139. The RF demodulator 139 responds to the mono audio signal, the NTSC video signal and an RF signal from a local RF oscillator 141, to produce a standard RF television signal on an available TV channel, typically channel 3 or channel 4.

The type of connection of the DET 100 to the television set depends on the capabilities of the user's television set. If the user has a monitor type television capable of receiving baseband video and stereo audio inputs, the appropriate terminals of the television would connect directly to the video and audio output terminals of the DET 100. If the subscriber does not have such a television monitor, then the RF output of the modulator 139 would be connected to the cable or antenna input connection of the television, e.g. by coaxial cable. Alternatively, the digitized video and audio may go to separate output terminals (not shown) for connection to inputs of digital display devices, for example, for high definition television (HDTV) sets.

Each DET also includes means to receive selection signals from a user and transmit appropriate data signals over a narrowband channel through the particular video network. For example, in the Video Dial Tone network of FIG. 3 discussed in more detail below, the DET 100 would send and receive control data through a 16 kbit/s channel on the subscriber's loop, and the network includes an X.25 type packet network for transport of the control signaling data.

In the embodiment illustrated in FIG. 1, the DET 100 includes an infrared (IR) receiver 145. The (IR) receiver 145 responds to inputs signals from a user operated IR remote control device (not shown) similar to that used today for controlling televisions and video cassette recorders. In response to the IR signals, the receiver 145 produces corresponding digital data output signals. The microprocessor 110 interprets the digital data signals by the IR receiver 145 as input commands. The precise interpretation of specific command signals can vary based on the downloaded applications programming and/or operating system software stored in the system memory 120. In response to the input commands, the microprocessor 110 controls cursor position and alphanumeric information displayed as graphics and text on the associated television set. The microprocessor 110 will also respond to an appropriate input command from the user to formulate a message for upstream transmission though the network interface module 101 and the signaling channel of the particular connected network.

The DET of the present invention is an open interface device in that it interacts with equipment of a large number of service providers (often referred to as "VIPs") to offer users a wide array of video and interactive multi-media services. The digital entertainment terminal (DET) is a programmable device to which different individual video information providers (VIP's) can download applications software, and at least one VIP (the VIP selling the DET) can download all or a part of the operating system. In non-volatile memory (ROM and non-volatile RAM), the DET will store a loader program and an operating system. The loader program and operating system in the ROM and the non-volatile RAM will include sufficient programming to control initial communications and define interfaces and drivers, e.g. for graphics to define the base line functionality of the DET for all service applications the DET will run. If connected to a network of the type illustrated in FIG. 3, for example, the loader program would enable initial communication with a level 1 gateway through the particular type of connected network.

Figure 2:
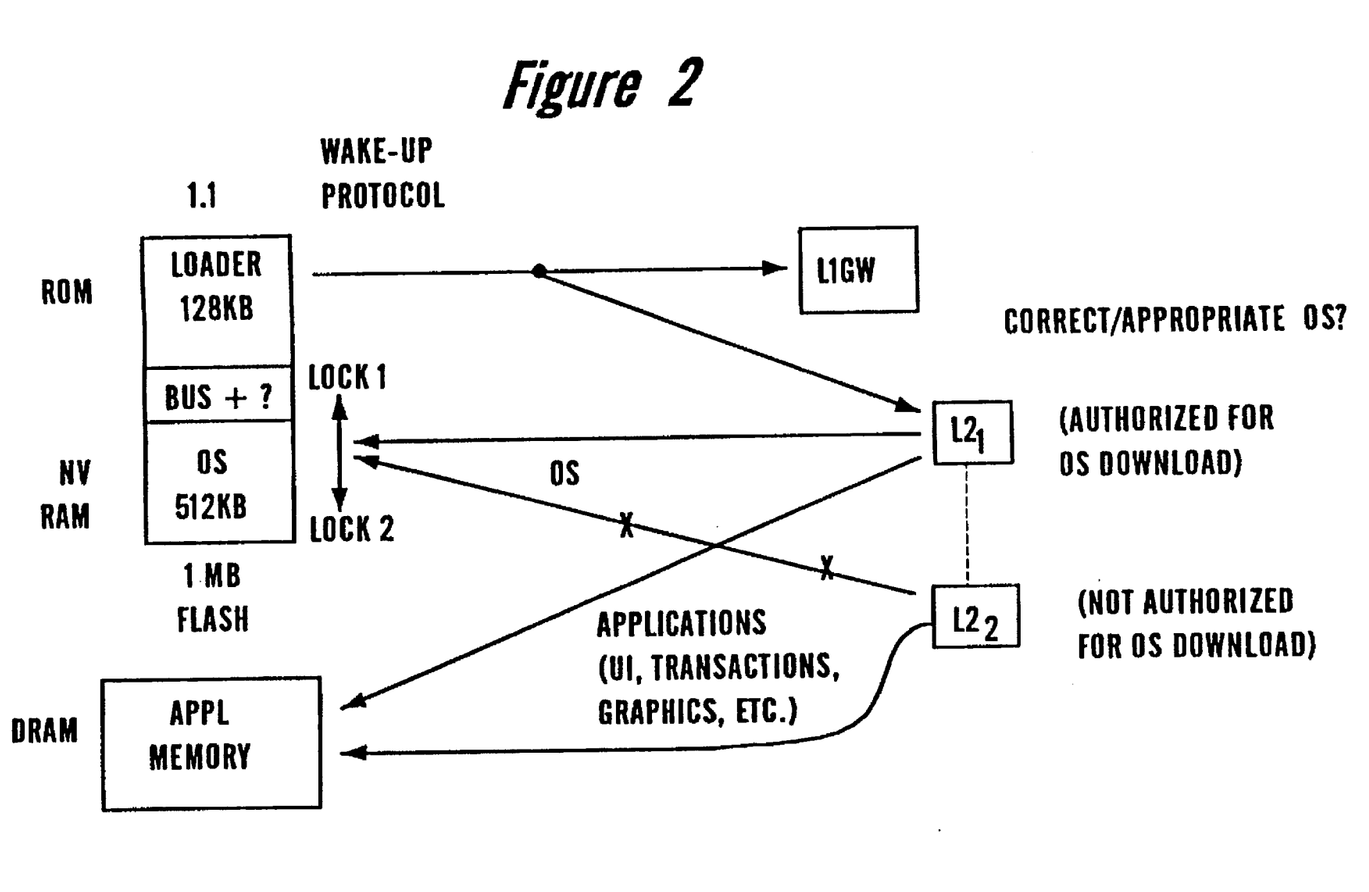
FIG. 2 shows a system memory layout for the digital entertainment terminal and an associated diagram of functions involved in memory management and software downloading in accord with the present invention.

FIG. 2 shows two separately mapped segments of memory, a non-volatile portion and a volatile portion. The non-volatile portion of the memory may consist of the ROM within the microprocessor (typically 128 kbytes) and the non-volatile RAM (minimum 512 kbytes to 1 mbyte) as discussed above. Alternatively, the entire non-volatile portion of the memory may consist of 1 mbyte of flash memory. The volatile portion of the memory consists 2 mbytes of DRAM.

The ROM (or corresponding segment of flash memory) stores a loader program for controlling many of the wake up functions of the CPU 105. The loader program is analogous to a BIOS (basic input/output system) in a PC. The loader program provides initial instructions to the microprocessor 110 to carry out a series of hardware diagnostics during an initial boot routine. If faults are detected, the loader routine will cause display of error codes and instructions on the associated television screen. For example, if the loader routine results in detection of a network error, the DET might generate a display instructing the subscriber to call a telephone number assigned to the Video Dial Tone network company together with a four digit code indicating the type of network fault, e.g. lack of a signaling channel or lack of a broadband channel. Alternatively, if faults in the DET are detected, the display would instruct the subscriber to call a telephone number assigned to the DET vendor together with a four digit code indicating the type of DET equipment fault, e.g. operating system memory error.

The loader routine also provides sufficient programming to access a level 1 gateway, L1GW in FIG. 2, and subsequently access a level 2 gateway (L2). For example, in the current implementations, the loader program includes sufficient software to permit signaling communications through the particular type of network interface module and network the DET connects to. For example, as will be explained in more detail below, the network of FIG. 3 utilizes X.25 control signaling. A portion of the loader program instructs the microprocessor how to send and receive signaling data in X.25 compatible formats. When a network interface module is replaced to permit communications via a different network, a technician must modify the communications software portion of the loader program. Alternatively, the communications protocol software could be stored on memory carried in the network interface module, and the loader program would retrieve that software from the interface module memory during initial boot-up.

The section of non-volatile memory storing the operating system is accessible to updating by a VIP with a level 2 gateway and associated server, only if the loader routine identifies the particular level 2 as one authorized to access the DET operating system. Typically, one of the VIP's will sell the DET to the subscriber. Although the subscriber can access other VIP's services using the DET and receive other VIP's applications software, only the level 2 gateways of the VIP selling the DET and/or a level 2 gateway operated by the manufacturer can update the operating system. The loader routine therefore identifies the level 2 gateways operated by or in cooperation with the VIP who sold the DET and the DET manufacturer. FIG. 2 shows a first level 2 gateway $L2_1$ authorized to rewrite the operating system. The second level 2 gateway $L2_2$ is not authorized to rewrite the operating system, as indicated by the X's across the arrow between that level 2 ($L2_2$) and the operating system (OS). The loader program therefore provides sufficient information to identify whether an accessed level 2 gateway is one authorized to rewrite the operating system portion of the non-volatile memory.

If flash memory is used for the loader program storage and operating system storage, then access to the different programs is limited by different types of flash memory "locks". The portion of the flash memory storing the loader routine typically would be protected by a hardware lock, e.g. burned out write pin on the chip, so that no one can access and change the loader routine. The lock on the remainder of the flash memory would be a software lock. If the DET accesses a VIP not identified in the loader routine, the lock would remain at the level illustrated by "lock 2" to protect all of the remainder of the non-volatile memory region against any input or overwriting of the stored operating system code. If the DET recognizes access to a VIP's level 2 gateway authorized to reprogram the operating system, the lock level would shift to "lock 1" in FIG. 2.

The precise level of "lock 1" may vary. For a level 2 gateway of the VIP who sold the DET, the gateway might be granted access to all of the rewriteable portion of the non-volatile memory, including any proprietary portion identified as "BVS" in the drawing. Some other VIP might be granted access to rewrite a portion of the operating system (OS) but not the proprietary portion. Also, control of the level of the lock 1 could ultimately be used to allow certain level 2 gateways access to the loader routine as well.

When a session is first set up, the DET transmits an initial message identifying itself and identifying the current versions of various modules of the operating system it is running. The level 2 gateway examines the operating system module information and determines whether each module corresponds to the version necessary to run the particular VIP's application programs. For example, if the application programs call for version 1.1 of the graphics driver, those applications may not run properly on a DET still using version 1.0 of that module of the operating system. The identification of the operating system modules therefore permits the level 2 gateway to determine if the DET is running operating system modules compatible with the VIP's programs. If the loader program identifies the level 2 gateway as a gateway authorized to rewrite the operating system software, and the level 2 gateway identifies one or more modules of the operating system needing to be changed to an earlier or later version thereof to achieve compatibility with the VIP's applications, the level 2 gateway will transmit an operating system rewrite code through the signaling portion of the network to the microprocessor 110. Subsequent data received over the broadband channel is routed to the microprocessor 110 and used to rewrite appropriate portions of the operating system.

For a selected VIP's level 2 gateway without access to the operating system but requiring one or more module versions not currently resident in the DET system non-volatile memory, that level 2 gateway would instruct the DET to access a neutral third party level 2 gateway and server, typically operated by the DET manufacturer, to obtain the module(s) needed for compatibility with the selected VIP's service applications. The DET would access the third party level 2 gateway and server, obtain the requisite operating system modules, and then initiate another session with the selected VIP's level 2 gateway and server.

In the memory management illustration of FIG. 2, any L2 level 2 gateway and associated server can download application program software to the DRAM application memory in the DET. The downloaded applications software controls a wide variety of DET functions in accord with each VIP's services. For example, this software may specify the functionality of the user interface (UI), types of transactions to be performed, graphics styles, etc. Once all necessary software resides in memory in the DET, the user begins interaction with the services offered by the particular service provider or VIP.

The downloaded software from one service provider or VIP might present menus and prompts in simple text form. Another provider, however, might choose to present menus and prompts in a much more graphical form approaching virtual reality. One user interface for interactive services might emulate a shopping mall. The precise presentation to the user displayed on the television set is determined by the software downloaded by the service provider and stored in the DET's system memory.

The DET 100 of the present invention may also include a number of additional interface devices. In the example illustrated in FIG. 1, the DET 100 includes an IR transmitter 147. The transmitter 147 responds to digital data signals from the microprocessor 110 and outputs corresponding IR signals for wireless transmission. The IR transmitter 147 and IR receiver 145 may operate together to provide a two-way wireless data communication link to some remote device, such as a personal data assistant (PDA) or pocket organizer. Alternatively, the IR transmitter may send signals to a remote display device for use in a service not requiring the TV set. For example, in an audio on demand service, the IR transmitter would send display data to an LCD display located near the user's stereo system.

The illustrated DET also includes an RS-232 transceiver 151 connected to the microprocessor 110. An RS-232 port is a standardized two-way serial data interface typically used for connecting computers to peripheral devices, such as modems. In the present system, the RS-232 transceiver 151 might provide a serial data connection to an external personal computer (PC), such that the DET permits communications between the PC and the Video Dial Tone network. Alternatively, this port might connect the DET to a printer, e.g. to print coupons during home shopping/browsing services. A hand-held diagnostic terminal would also connect to this port during servicing of the DET. The communications and protocols offered by the DET through the transceiver 151 would be controlled by the operating system and applications program software downloaded into the system memory 120.

FIG. 1 also shows the DET 100 including a magnetic card reader 153 connected to the microprocessor 110. This reader 153 could be used to scan credit card information encoded on magnetic strips on commonly available credit cards. In a home shopping and purchasing service, controlled by the downloaded software, the user would scan their own credit card through the magnetic card reader 153 as part of the payment operations. The reader could also have magnetic write capabilities to perform debit card operations.

The illustrated DET 100 further includes a personal computer memory-card interface adapter (PCMCIA) port 155. This is a two-way interface for connection to and communication with a flash memory module, such as is now incorporated into advanced "smart card" devices. In a medical service, a user might communicate with a medical information database through the DET 100 and the broadband network. The user's personal medical history information could be read from the smart card and subsequently updated on the smart card, through the PCMCIA port 155. Another use of this port might involve communication to a connected video game system to download video game software to the video game system and/or play interactive video games. Although specified as a "memory" port and mapped by the CPU as part of its system memory space, the devices connected to this port 155 can have other data processing capabilities, e.g. buffering and modem communication capability.

In the current implementation, the PCMCIA port 155 will carry 6 Mbits/s of data, but the port can be designed for higher speeds such as 20 Mbytes/s. Another use of this port would be for connection to an Ethernet card or other Local Area Network (LAN) card to permit data communications between the DET and one or more computers. The DET would provide the computers with communications services through the broadband network, for example to receive high speed downloads of new or updated software for those computers. Although similar functions are possible through the RS-232 transceiver 151, the data rate through the PCMCIA port 155 is much higher.

The software downloading procedure, executed through a specific network, will be discussed in more detail below after the description of the exemplary network architecture.

FIG. 3 is a block diagram of one type of broadband network for providing interactive services, such as video on demand, home shopping or purchasing, home banking, medical information, ticket ordering, gaming, etc. In the network shown the customer premises equipment (CPE) consists of a set top terminal type DET 100 and a telephone (POTS or ISDN). The connections to the central office utilize Asymmetrical Digital Subscriber Line (ADSL) technology, typically over twisted wire pair. The ADSL connection provides a 1.5 Mb/s downstream video information channel, a two-way telephone connection and a two-way 16 kbit/s control channel. The illustrated Video Dial Tone network architecture may use some form of fiber extension in the actual subscriber loops, to provide services to subscribers located more than 1.5 kilo-feet from a central office. In the illustrated network, the drop to the subscriber's premises is always a wired ADSL loop.

As shown in FIG. 3, the network interface module in the DET 100 connects to an ADSL multiplexer/demultiplexer 201 similar to the in-home ADSL unit in the above discussed Litteral et al. Patent. The connection between the network interface module of the DET 100 and the in-home ADSL unit 201 may consist of an RJ48C line and connectors. Such a link comprises six wire pairs, two for the broadband data, two for upstream signaling and two for downstream signaling.

Each ADSL subscriber line 203 will connect to an ADSL bay 205 located in or associated with the subscriber's local central office. For each subscriber line 203, the ADSL bay 205 includes an ADSL multiplexer/demultiplexer similar to the central office ADSL unit in the above discussed Litteral et al. Patent. The ADSL bay 205 provides transport for voice signals on the subscriber loop to and from the associated voice switch 207. The ADSL bay 205 also connects to an access concentrator 209 for providing two-way signaling connections through an X.25 type packet switched data network 211. The ADSL bay 205 also receives broadband digital signals for downstream transport over the ADSL line 203 to each subscriber's premises from a digital cross connect switch 213, labelled "Access DCS" in the drawing. One ADSL line to the home carries one channel of video programming and provides a single output channel. The output channel can provide a video signal to a VCR or to the TV set 100'. The various Access DCS switches throughout the network are controlled by switch controller 212.

If the ADSL bay 205 is local, i.e. located in the same telephone company central office as the cross connect switch DCS 213, the ADSL bay 205 connects to the Access DCS 213 via an appropriate number of local DS1 connections 215. In service areas where an ADSL bay does not carry enough traffic to warrant an associated Access DCS, the ADSL bay will be located in a remote central office facility. Such a remote ADSL bay connects to the Access DCS 213 via a SONET type optical fiber link 217 providing an appropriate number of multiplexed channels to service the number of subscribers connected to the particular ADSL bay.

Video Information service Providers (VIP's) may access the downstream broadband portion of the system at a hub location (not shown) within a given LATA. The hub will not perform any switching. High capacity optical fiber links are aggregated at the hub to provide each VIP with a number of connections (e.g. one or more OC-3 links) from their respective video server to each Access DCS within the LATA.

The Access DCS 213 provides both point-to-point connections and point-to-multipoint connections. Individualized interactive services, such as Video On Demand, home shopping/purchasing and banking, use point-to-point connections wherein the Access DCS connects one broadband input port from a VIP's server to one output port going to the subscriber's ADSL line. Narrowcast and broadcast services utilize point-to-multi-point connections of one input port to a plurality of output ports.

The illustrated architecture of the Video Dial Tone network utilizes two levels of gateways, both of which will communicate with subscribers' DET's via the X.25 data network 211 and the signaling channel on the ADSL subscriber loops 203.

The level 1 gateway 221 performs a variety of network connectivity related functions, including communications port management of transmissions of information between subscribers and servers, processing of billing information and session management. Normally, each subscriber accesses the level 1 gateway (e.g. to select and access a particular VIP's server) by operation of a remote control device which causes the subscriber's DET 100 to transmit data signals to the level 1 gateway via the 16 Kb/s control channel and the X.25 packet switched data network 211. The level 1 gateway transmits one or more selection menus to the subscriber's DET 100 as screens of text data carried by the same path back through the network. In a typical scenario, the user would turn on the DET, and in response to data signals from the level 1 gateway 221, the DET 100 would display an initial selection menu on the associated television set 100'. The subscriber then would input a VIP selection, and in response to an appropriate data signal from the DET 100, the level 1 gateway 221 would instruct the various network components to set up an X.25 virtual circuit to the level 2 gateway of the selected VIP for signaling purposes and a direct downstream path from the VIP's server through the DCS 213 for video transmission. For simplicity, the VIP's gateway and server appear as a single unit 225.

A level 2 gateway provides a number of services for the Information Providers. These services include transmission of menus of available information to subscribers, searches of available information, targeted advertisement insertion, previews, trailers, etc. The level 2 gateway will download video or audio menus to each subscriber's DET for display, thereby allowing each subscriber to select desired information. Once a subscriber makes a selection, the level 2 gateway will signal the appropriate server to schedule transmission of the selected information through the established downstream video transmission path. The level 1 gateway accumulates connectivity charge information for purposes of billing each called VIP. The level 2 gateway records transactions, e.g. movies viewed, by each subscriber for billing purposes. The level 2 gateway also interacts with the DET 100 and controls the associated servers to download executable program code for storage in the DET system memory, as discussed above.

The Video Dial Tone network provides video on demand and closely related interactive multimedia services. For example, using the upstream data channel, the subscriber can send a request for a particular movie, and the VIP's server will retrieve and transmit that movie as an MPEG digital data stream on the 1.5 Mb/s downstream channel to the digital audio/video processor in the subscriber's DET 100. The DET converts the digital data stream to a signal for driving a standard television set for real time viewing of the movie by the subscriber. The performance of the DET functions are defined by the software in the DET system memory, thus each VIP can develop a different look and feel for their video on demand service by downloading different software to the DET memory.

Several other services offered may appear somewhat different to the subscriber but will function in exactly the same manner as video on demand. For example, one VIP might offer a 'Home Box Office' (HBO) on demand service. All HBO programming for a given month would be stored in that VIP's server and provided to individual HBO subscribers on an on-demand basis, rather than as a broadcast service. As another example, a subscriber playing a video game offered by the VIP 252 would obtain a video dial tone signaling link and a video transmission link through the network in exactly the manner described above. When the subscriber makes a move or entry in the game, the DET would send a control signal defined by the DET software upstream to VIP 252, and the VIP's game server would respond by generating and transmitting an appropriate video signal back to the DET and the subscriber's television set through the point to point connection through the DCS, the ADSL bay and the subscriber's line, exactly as was done for video on demand. The server might also transmit graphics overlay information back to the DET 100 through the X.25 network 211 and the signaling channel on the subscriber's ADSL line 203.

Specific examples of dynamic programming of the DET through the Video Dial Tone Network of FIG. 3 are discussed below.

With the present invention, when the subscriber turns on the DET 100, the loader routine and/or operating system will control wake up, and the DET will transmit an initial message to the level 1 gateway. In the network of FIG. 3, the message is carried over the 16 kbit/s signaling channel on the ADSL subscriber's line, and the access concentrator 209 packetizes the message and adds header information to facilitate transport through the X.25 network 211. In response to the initial message, the level 1 gateway transmits ASCII text representing one or more pages of a VIP selection menu back to the DET 100 through the X.25 network and the signaling channel on the subscriber's line. Upon receipt of the menu data, the DET 100 would display an initial selection menu on the subscriber's television set.

The subscriber may review the menu on their television set, and then input a selection using the infrared remote control device, either by moving a cursor to an appropriate point on the screen and hitting <ENTER> or by inputting digits followed by <ENTER>. In response to the VIP selection input, the DET 100 will transmit an appropriate data signal upstream through the network to the level 1 gateway 221.

The access concentrator 209 identifies the subscriber and includes an X.121 address for the X.25 network port assigned to the subscriber in the header of all signaling packets sent from the DET through the X.25 network. The level 1 gateway 221 receiving X.25 packets of DET signaling data therefore knows the X.121 address of the subscriber. The level 1 gateway 221 uses that information together with the VIP selection input to initiate an X.25 data call to the VIP's level 2 gateway to ask if the subscriber is a valid customer of the particular VIP. If the level 2 gateway indicates that the subscriber is valid, the level 1 gateway 221 instructs controller 212 to control the digital cross connect switch DCS 213 to set up a downstream broadband link from the VIP's file server to the subscriber's DET 100 and drops the X.25 communication link to the DET. At approximately the same time, the VIP's level 2 gateway initiates an X.25 call to the subscriber's DET 100. Completion of set-up of both the broadband link and the X.25 signalling link to the DET establishes a video session between the VIP's gateway and server system 252 and the subscriber's DET 100.

Once a session is established, the level 2 gateway executes a two-way communication with the DET 100 through the X.25 network 211 and the signaling channel to determine if the operating system software stored in the DET 100 is compatible with the VIP's service applications. If not, the operating system software is modified in the manner discussed above relative to FIG. 2. Once the operating system software in the DET is compatible with the VIP's services, the level 2 gateway sends a command to the DET 100 through the X.25 network 211 and the signaling channel instructing the DET to accept new application programming software.

The MPEG system demultiplexer 127 circuitry recognizes packets in the MPEG data stream received over the broadband channel as video, audio or data. Video and audio packets are routed to the appropriate decoders 129, 131, but the data is routed to the microprocessor 110 within the CPU 105 for further processing. For example, in response to the instruction regarding application programming software, data routed to the CPU 105 is loaded into volatile memory (RAM) 122 for subsequent use in controlling operations of the DET 100. A security code may also be transmitted to permit overwriting of all or selected portions of the operating system software stored in the-non-volatile memory (NVRAM) 121, e.g. as part of the procedure for recognizing a level 2 gateway authorized to access the operating system.

When another provider is selected, either after completion of an ongoing session or after a later turn-off and turn-on of the DET, the DET 100 will receive at least another downloaded application software program appropriate to the newly selected provider. The latest received application software is written into the RAM 122 of the DET over the previously stored software. Alternatively, if a particular provider desires to substitute a second application program during a single session, e.g. to shift from a video on demand application to a video game application, the provider's level 2 gateway could send an appropriate control code through the signalling link followed by transmission of the new program software through the broadband channel and over-writing of the program in the RAM 122.

In networks having broadcast services, such as disclosed in the above cited Full Service Network application 08/250, 792, at turn-on, the DET could enter a mode for reception of the broadcast service. In such a case, the non-volatile memory in the DET stores operating system software including instructions for controlling selection of the broadcast services. The level 1 gateway would be accessed in response to a user operating an appropriate button on the remote control, after which the user would select a VIP, and the DET would interact with the VIP's level 2 gateway and file server to obtain applications software programming and/or operating system changes. Several aspects of broadcast services will be discussed in more detail later.

Alternatively, in networks carrying broadcast services, the DET would turn-on in a mode for accessing the level 1 gateway exactly as in the network of FIG. 3. If the subscriber selected a broadcast service, the network would provide communications with a level 2 gateway for the particular VIP's broadcast services, and the level 2 gateway would download appropriate application software using the above discussed procedure. The downloaded broadcast application software would include program/channel mapping tables, to permit users to select channels with a standard channel number even though the program may be carried on an unrelated channel within the network. For example, one broadcast provider might carry the local NBC station on channel 17, another broadcast provider might carry that station on channel 77, and the local over the air broadcast would be on standard RF TV channel 4. If the user selected the first provider, the mapping table would indicate that broadcast channel 4 is carried on network channel 17. If the user selected the second provider, the mapping table would indicate that broadcast channel 4 is carried on network channel 77. In either case, the user would select the channel simply by inputting the number 4. The subscriber does not need to know which network channel each VIP uses for that broadcast service.

As noted above, the same DET can be used in a variety of different networks, with only a substitution of a different network interface module to adapt the DET to each particular network. One key feature that will change as the DET is adapted to the different networks relates to addressing. In implementation of Video Dial Tone discussed in detail above, the video and downloaded programming data are transported in an MPEG 2 data stream which is digitally cross connected from the VIP's server to the subscriber's line. In contrast, the network disclosed in the Full Service Network application 08/250,792 cited above will utilize ATM switching to transport the MPEG streams.

Asynchronous transfer mode or "ATM" switching is an advanced, high-speed packet switching technology. MPEG (motion picture experts group) is a broad generic standard for video program compression, and MPEG 2 is a second generation compression standard for encoding each video program signal into a 6 Mbit/s bit stream. In ATM based networks, the MPEG 2 bit streams are converted into cellular payload data, and cell headers are added. The ATM cell header information includes a virtual circuit identifier/virtual path identifier (VCI/VPI) to identify the particular communication each cell relates to. For example, for broadcast signals, the VCI/VPI will identify a particular program channel. For a point to point transmission, e.g. for video on demand or for transmission of downloaded application programming software, the VCI/VPI in each header of the ATM cells would effectively identify specific end points of the virtual communication link. The identification of the receiving end of such a point to point link effectively addresses the ATM cells to the particular DET. In a network using such cell transmission the loader program would instruct the DET to process VCI/VPI information, e.g. to recognize the terminal's own ATM destination address in the incoming cell stream.

There are a wide variety of uses of the software downloading function of the present invention, several of which have been noted above. Additional representative examples follow.

In a video on demand application, the downloaded application software might specify precisely how the DET will perform certain functions, such as pause. For example, one VIP's application software might specify only that when the user enters a "PAUSE" command, the DET sends a message through the signaling channel the level 2 gateway to stop the server. A finite period of time passes before the command reaches the level 2 gateway, an instruction goes to the server, the server stops actual transmission, and the last transmitted frame goes downstream and is frozen for display by the DET 100 on the subscriber's TV 100'. Another VIP might offer an enhanced pause functionality as discussed below.

With the enhanced pause functionality software downloaded to the DET memory, when a subscriber enters a "PAUSE" command, the DET 100 immediately freezes decoding and displays the last decoded frame. The viewer sees an immediate pause of the program on the television set. The DET also transmits a time stamp derived from the MPEG data of the frozen frame together with a pause command upstream to the video on demand level 2 gateway and server 252. The server stops transmitting video and stores the time stamp. When the viewer inputs a command to resume playback, the DET 100 transmits another signal to the video on demand level 2 gateway and server 252. The server resumes transmission from the frame group indicated by the time stamp. When the DET receives MPEG data for frames bearing a time stamp the same as or later than the frozen frame, the DET resumes decoding based on the newly received frame data. To the viewer, it appears as if playback resumed without jitter from the exact frame frozen at the moment of pause command input. Also, the DET will not accept additional pause commands until new video frames are received and decoded indicating actual resumption of playback.

Also, surfing of MPEG encoded broadcast channels entails certain problems involved in locking onto new MPEG data streams. Certain data is needed to lock on and begin decoding of MPEG data. In a video on demand or other interactive video transmission service, initial values for all of this data are transmitted in the first few frames of transmitted data and are retransmitted only when updates are needed. In a multi-channel broadcast service, however, the data frames and headers carrying such information are transmitted periodically in each program. The headers and data frames specify program specific information, program allocation maps, program maps, video frame rates, etc. in accord with the MPEG 2 standard. If this data is transmitted often to permit rapid channel changes, then the amount of program payload data decreases. If the data is transmitted less often, the DET must wait longer to obtain the data and begin actual decoding, and the viewer observes a longer waiting period between channels during each change. The present invention solves these problems by downloading an initial set of the necessary MPEG decoding data for all of a VIP's broadcast programs as part of the application software downloaded and stored in the volatile RAM 122, when the DET first accesses a broadcast service VIP. Subsequently, each time a user selects a broadcast channel, the DET utilizes the cached data for that channel to attempt to begin decoding that channel. As the DET receives and decodes different channels, the cached data is updated for each channel with any data that may have changed. The MPEG data streams, capture of data needed for decoding and an alternate solution to the channel surfing problem are discussed in more detail in commonly assigned application Ser. No. 08/249,572, filed May 26, 1994, entitled "Method and Apparatus for Rapid Channel Change Selection and Simulated Fast Forward/Reverse" (attorney docket no. 680-086), the disclosure of which is incorporated herein entirely by reference.

The present invention is amenable to a wide variety of enhancements, as will be apparent to readers who are skilled in video and data communications arts. For example, the current software implementations of the network and the DET discussed above are based on an assumption that all calls are initiated as outgoing calls from an end user to a service provider or "VIP". This is referred to as a "pull" model in that the subscriber must initiate withdrawal or "pull" desired information from a service vendor. In such an arrangement, the DET will not receive unsolicited calls. This provides the subscriber with a high level of privacy. For example, the DET will not receive unsolicited junk mail type advertising from vendors the subscriber has not deliberately called. The network, however, can be used to receive advertising or mail type information, but the subscriber must initiate a request for the information from a storage device operated by a service provider. If desired, the software of the network and the DET could be modified to permit incoming calls to the DET, as well as outgoing calls.

Also, the discussion of FIG. 3 above assumed that each ADSL line provided by the network connects to only one DET. The DET therefore did not need to recognize its own address or program identifiers in the broadband data stream. Advanced networks, however, will transport different broadband data streams over each subscriber loop for a plurality of DET's in each home. Consequently, each DET in the home will have its own address and will recognize that address as well as different broadcast channel identifiers in the particular type of broadband data stream transported into the home, e.g. multi-channel MPEG 2 or MPEG 2 transported in ATM cell form. The DET will also perform this address recognition on broadband data carrying applications software and/or operating system software being downloaded into the DET.

Although preferred embodiments of the digital entertainment terminal, a digital video distribution network, and methods of programming the terminal, in accord with the invention have been described in detail above, it should be clear that the present invention is capable of numerous modifications as would be apparent to one of ordinary skill in the art. Such modifications fall within the purview of the appended claims.

We claim:

1. A digital entertainment terminal comprising:
    a network interface module for coupling the terminal to a communication network, serving a plurality of information service providers, for receiving a digital broadband channel and providing two-way control signaling communication between the terminal and the network;
    a control processor controlling operations of the terminal and sending control signals over the two-way control signaling channel through the network interface module in response to selection signals and receiving control signals over the two-way control signaling channel through the network interface module;
    means for receiving inputs from a user and providing said corresponding selection signals to the control processor;
    program memory for storing software executable by the control processor, wherein in response to a command code within the received control signals received over the two-way signaling channel, the control processor causes data including software to be received over the digital broadband channel from a selected one of the service providers to be stored in the program memory; and
    an audio/video processor controlled by the control processor, said audio/video processor being responsive to compressed, digital audio and video information received over the broadband channel to produce signals for driving an audio/video display device,
    wherein the control processor executes the software received and stored in the program memory to control subsequent operations of the terminal, including at least some operations of the audio/video processor and at least some responses to the inputs from the user.

2. A digital entertainment terminal as in claim 1, wherein the audio/video processor comprises:
    an audio/video decoder for decompressing the compressed, digital information received over the broadband channel to produce a decompressed video signal and a decompressed audio signal;
    a graphics overlay controller, controlled by said control processor, for generating graphic display information; and
    means for combining the graphic display information with the decompressed video signal.

3. A digital entertainment terminal as in claim 2, wherein the audio/video decoder comprises:
    an MPEG video decoder;
    an MPEG audio decoder; and
    an MPEG demultiplexer for selectively routing MPEG encoded video and audio packets carried on the digital broadband channel to the MPEG video decoder and the MPEG audio decoder, respectively.

4. A digital entertainment terminal as in claim 2, wherein the audio/video processor further comprises output means responsive to a signal from the means for combining and the decompressed audio signal for producing at least one output signal for driving a television receiver type audio/video display device.

5. A digital entertainment terminal as in claim 1, wherein the software received and stored in the memory comprises an application program to be executed by the control processor to provide the user a specific interactive service during the reception of said compressed, digital audio and video information over the broadband channel.

6. A digital entertainment terminal as in claim 1, wherein the software received and stored in the memory includes at least a portion of an operating system to be executed by the control processor during subsequent provision of a plurality of interactive services during the reception of said compressed, digital audio and video information over the broadband channel.

7. A method of providing an interactive communication service comprising:
    establishing a communication link between a selected one of at least two available information service providers supplying software and digitized audio and video information and a digital entertainment terminal, said communication link providing downstream transport of broadband, digital information to the digital entertainment terminal;
    receiving the corresponding software executable by a control processor of the digital entertainment terminal from the one information service provider via the communication link;
    storing the software in a memory within the digital entertainment terminal;
    receiving digitized audio and video information over the communication link; and
    supplying the software from the memory to the control processor for execution, to control interactions of a user of the digital entertainment terminal with a service offered by the one information service provider and to produce an audio/video output responsive to the received digitized audio and video information.

8. A method as in claim 7, wherein the software received and stored in the memory is a complete application program for providing the user a specific interactive service offered by the one information service provider through the communication link.

9. A method as in claim 7, wherein the software received and stored in the memory includes at least a portion of an operating system of the control processor.

10. A method as in claim 9, wherein the step of storing the software in memory is dependent on whether the one information service provider is authorized access to operating system software stored in the memory.

11. A method as in claim 7, further comprising the steps of:

establishing a new broadband, digital communication link between the digital entertainment terminal and a second information service provider different from the one information service provider;

receiving software executable by the control processor of the digital entertainment terminal via the new communication link from the second information service provider;

writing the software from the second information service provider over software previously stored in the memory within the digital entertainment terminal;

receiving digitized audio and video information over the new communication link from the second information service provider; and supplying the software from the second information service provider from the memory to the control processor for execution, to control interactions of the user of the digital entertainment terminal with a service offered by the second information service provider and to produce an audio/video output to the user responsive to the digitized audio and video information received from the second information service provider.

12. A method as in claim 7, further comprising the steps of:

receiving a command from the one information service provider;

receiving new software executable by the control processor of the digital entertainment terminal from the one information service provider via the communication link;

writing the new software over software previously stored in the memory within the digital entertainment terminal;

receiving further digitized audio and video information over the downstream, broadband, digital communication link; and supplying the new software from the memory to the control processor for execution, to control interactions of the user with a service offered by the one information service provider and to produce an audio/video output responsive to the further digitized audio and video information.

13. A method as in claim 7, wherein the establishing step comprises:

receiving a service provider selection as an input to the digital entertainment terminal;

in response to the selection input, establishing a two-way signaling communication link between the digital entertainment terminal and a gateway operated by the one information service provider; and establishing a downstream, broadband, digital communication link between the digital entertainment terminal and a server operated by the one information service provider.

14. A digital entertainment terminal comprising:

a network interface module for coupling the terminal to a communication network for receiving a digital broadband channel and providing two-way control signaling communication between the terminal and the network;

a control processor controlling operations of the terminal and sending and receiving control signals over the two-way control signaling channel through the network interface module;

means for receiving inputs from a user and providing corresponding signals to the control processor;

system memory for storing software executable by the control processor, the system memory comprising non-volatile memory storing an operating system for the control processor and random access memory storing application software executable by the control processor, at least a portion of the application software having been received over the communication network; and an audio/video processor responsive to compressed, digital audio and video information received over the digital broadband channel through the network interface module and controlled by the control processor during execution of said software, the audio/video processor comprising:

(a) an audio/video decoder for decompressing the compressed, digital information received over the broadband channel to produce a decompressed video signal and a decompressed audio signal;

(b) a graphics overlay controller, controlled by the control processor during execution of said software, for generating graphic display information; and (c) means for combining the graphic display information with the decompressed video signal, to produce a signal for driving a video display device.

15. A digital entertainment terminal as in claim 14, wherein the network interface module is a replaceable module detachably coupled to the digital audio/video processor and the control processor.

16. A digital entertainment terminal as in claim 14, wherein the audio/video decoder comprises:

an MPEG video decoder;

an MPEG audio decoder; and an MPEG demultiplexer for selectively routing MPEG encoded video and audio packets carried on the digital broadband channel to the MPEG video decoder and the MPEG audio decoder, respectively.

17. A digital entertainment terminal as in claim 14, wherein the audio/video processor further comprises output means responsive to the signal from the means for combining and the decompressed audio signal for producing at least one output signal for driving a television receiver type audio/video display device.

18. A digital entertainment terminal as in claim 17, wherein the output means comprises:

a video digital to analog converter responsive to the signal from the means for combining; and an audio digital to analog converter responsive to the signal from the decompressed audio signal.

19. A digital entertainment terminal as in claim 14, wherein the means for receiving inputs from a user comprises an infrared receiver.

20. A digital entertainment terminal as in claim 14, further comprising an infrared transmitter responsive to signals from the control processor.

21. A digital entertainment terminal as in claim 14, further comprising a serial data transceiver port coupled to the control processor.

22. A digital entertainment terminal as in claim 14, further comprising a magnetic card reader coupled to the control processor.

23. A digital entertainment terminal as in claim 14, further comprising a memory card interface port coupled to the control processor for two-way data communication therewith.

24. A communication method comprising:

establishing a communication link between a digital entertainment terminal and one of a plurality of available information service providers carrying broadband digital information to the digital entertainment terminal;

determining if the one information service provider is authorized to download operating system software;

if the one service provider is authorized, receiving operating system software executable by a control processor of the digital entertainment terminal from the one information service provider via the communication link and storing the operating system software in a memory within the digital entertainment terminal;

receiving digitized audio and video information over the communication link; and supplying the operating system software from the memory to the control processor for execution to control operations of the digital entertainment terminal.

25. A method as in claim 24, further comprising the steps of:

receiving application software executable by the control processor from the one information service provider via the communication link;

storing the application software in the memory within the digital entertainment terminal; and supplying the application software from the memory to the control processor for execution under control of the operating system, to control interactions of a user of the digital entertainment terminal with a service offered by the one information service provider and to produce audio/video information outputs to the user responsive to the received digitized audio and video information.

26. A method as in claim 25, further comprising the steps of:

establishing a new communication link between the digital entertainment terminal and a second information service provider different from the one information service provider;

receiving application software executable by the control processor of the digital entertainment terminal via the new communication link from the second information service provider;

writing the application software from the second information service provider over application software previously stored in the memory within the digital entertainment terminal;

receiving digitized audio and video information over the new communication link from the second information service provider; and supplying the application software from the second information service provider from the memory to the control processor for execution, to control interactions of the user of the digital entertainment terminal with a service offered by the second information service provider and to produce audio/video information outputs to the user responsive to the digitized audio and video information received from the second information service provider.

27. A method as in claim 25, further comprising the steps of:

receiving a command from the one information service provider;

receiving new application software executable by the control processor of the digital entertainment terminal from the one information service provider via the communication link;

writing the new application software over application software previously stored in the memory within the digital entertainment terminal;

receiving further digitized audio and video information over the communication link; and supplying the new application software from the memory to the control processor for execution, to control interactions of the user with a service offered by the one information service provider and to produce audio/video information outputs to the user responsive to the further digitized audio and video information.

28. A communication method comprising:

establishing a communication link between a digital entertainment terminal and one of a plurality of available information service providers carrying broadband, digital information to the digital entertainment terminal;

determining if operating system software previously stored in a memory within the digital entertainment is compatible with a service offered by the one information service provider;

if the previously stored operating system software is compatible, supplying the previously stored operating system software from the memory to a control processor for execution;

if the previously stored operating system software is not compatible:

(1) determining if the one information service provider is authorized to download operating system software, (2) if the one information service provider is authorized, receiving new operating system software executable by the control processor from the one information service provider via the communication link, (3) writing the new operating system software in the memory over the previously stored operating system software, and (4) supplying the new operating system software from the memory to the control processor for execution;

receiving digitized audio and video information over the communication link; and providing the user a service responsive to the received digitized audio and video information and controlled by the executed operating system software.

29. A method as in claim 28, further comprising the steps of:

receiving application software executable by the control processor from the one information service provider via the communication link;

storing the application software in the memory within the digital entertainment terminal; and supplying the application software from the memory to the control processor for execution under control of the operating system, to control interactions of a user of the digital entertainment terminal with said service offered by the one information service provider and to produce audio/video information outputs to the user responsive to the received digitized audio and video information.

30. A method as in claim 29, further comprising the steps of:

establishing a new communication link between the digital entertainment terminal and a second information service provider different from the one information service provider;

receiving application software executable by the control processor of the digital entertainment terminal via the new communication link from the second information service provider;

writing the application software from the second information service provider over application software previously stored in the memory within the digital entertainment terminal;

receiving digitized audio and video information over the new communication link from the second information service provider; and supplying the application software from the second information service provider from the memory to the control processor for execution, to control interactions of the user of the digital entertainment terminal with a service offered by the second information service provider and to produce audio/video information outputs to the user responsive to the digitized audio and video information received from the second information service provider.

31. A method as in claim 29, further comprising the steps of:

receiving a command from the one information service provider;

receiving new application software executable by the control processor of the digital entertainment terminal from the one information service provider via the communication link;

writing the new application software over application software previously stored in the memory within the digital entertainment terminal;

receiving further digitized audio and video information over the communication link; and supplying the new application software from the memory to the control processor for execution, to control interactions of the user with a service offered by the one information service provider and to produce audio/video information outputs to the user responsive to the further digitized audio and video information.

32. An information distribution system comprising:

a communication network selectively providing control signaling links and broadband communications channels;

a plurality of information service provider systems connected to the network, each provider system being capable of receiving control signal inputs via a control signaling link through the communication network and transmitting broadband digital information via a broadband communication channel through the communication network; and a plurality of digital entertainment terminals, one terminal comprising:

a network interface module for coupling the one terminal to the communication network for receiving a digital broadband channel from one of the provider systems and transmitting control signals to the one provider system;

a control processor controlling basic operations of the one terminal in response to execution of operating system software and generating the control signals for transmission to the one provider system;

means for receiving inputs from a user and providing corresponding signals to the control processor;

program memory for storing application software executable by the control processor, wherein the control processor causes predetermined data received over the digital broadband channel to be stored as said application software in the program memory; and an audio/video processor responsive to compressed, digital information received over the digital broadband channel to produce a signal for driving an audio/video display device, wherein the control processor executes the application software in the memory to control subsequent operations of the one terminal, including at least some operations of the audio/video processor and at least some responses to the inputs from the user in accord with a service offered by the one provider system.

33. A system as in claim 32, wherein the one provider system comprises:

a server storing the predetermined data and storing the compressed, digital information; and a gateway for receiving the control signal inputs via the control signaling link through the communication network and controlling transmission of the predetermined data and the compressed digital information through the communication network to the one terminal.

34. A system as in claim 33, wherein the communication network comprises a telephone network.

* * * * *

(12) EX PARTE REEXAMINATION CERTIFICATE (9361st)
United States Patent
Kostreski et al.

(10) Number: US 5,635,979 C1
(45) Certificate Issued: Oct. 10, 2012

(54) DYNAMICALLY PROGRAMMABLE DIGITAL ENTERTAINMENT TERMINAL USING DOWNLOADED SOFTWARE TO CONTROL BROADBAND DATA OPERATIONS

(75) Inventors: Bruce Kostreski, Wheaton, MD (US); Eugene L. Lew, Olney, MD (US); Henry G. Hudson, Jr., Annapolis, MD (US); Daniel O'Callaghan, Fairfax Station, VA (US)

(73) Assignee: Verizon Communications Inc., New York, NY (US)

Reexamination Request:
No. 90/011,727, Jun. 2, 2011

Reexamination Certificate for:
Patent No.: 5,635,979
Issued: Jun. 3, 1997
Appl. No.: 08/250,791
Filed: May 27, 1994

(51) Int. Cl.
*H04N 7/173* (2006.01)
(52) U.S. Cl. ......... 725/132; 725/121; 725/131; 725/134
(58) Field of Classification Search .................. None
See application file for complete search history.

(56) References Cited

To view the complete listing of prior art documents cited during the proceeding for Reexamination Control Number 90/011,727, please refer to the USPTO's public Patent Application Information Retrieval (PAIR) system under the Display References tab.

*Primary Examiner* — Eron J Sorrell (57) ABSTRACT

Dynamic programming of a digital entertainment terminal (DET) facilitates operation of the terminal to offer a variety of functionally different broadband services. The terminal can be reprogrammed, as-needed, for each different service offered by one or more information service providers. The terminal includes a network interface module which couples the terminal to a specific type of communication network for receiving a digital broadband channel and providing two-way control signaling communication between the terminal and the network. The terminal also includes a control processor with a program memory. The control processor receives user inputs and controls operations of the terminal and sending and receiving of control signals over the two-way control signaling channel. The program memory stores data received over the digital broadband channel as software executable by the control processor. The audio/video processor converts compressed, digital information received over the broadband channel into signals for driving an audio/video display device, such as a standard television set. The control processor executes the software received and stored in the memory to control subsequent operations of the terminal, including at least some operations of the audio/video processor and at least some responses to user inputs.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 14, 16 and 19 is confirmed.

Claim 1 is determined to be patentable as amended.

Claims 2, 3 and 5, dependent on an amended claim, are determined to be patentable.

Claims 4, 6-13, 15, 17, 18 and 20-34 were not reexamined.

1. A digital entertainment terminal comprising:
   a network interface module for coupling the terminal to a communication network, serving a plurality of information service providers, for receiving a digital broadband channel and providing two-way control signaling communication between the terminal and the network;
   a control processor controlling operations of the terminal and sending control signals over the two-way control signaling channel through the network interface module in response to selection signals and receiving control signals over the two-way control signaling channel through the network interface module;
   means for receiving inputs from a user and providing said corresponding selection signals to the control processor;
   program memory for storing software executable by the control processor, wherein in response to a command code within the received control signals received over the two-way signaling channel, the control processor causes data including software to be received over the digital broadband channel from [a] *the* selected one of the service providers to be stored in the program memory; and
   an audio/video processor controlled by the control processor, said audio/video processor being responsive to compressed, digital audio and video information received over the broadband channel to produce signals for driving an audio/video display device,
   wherein the control processor executes the software received and stored in the program memory to control subsequent operations of the terminal, including at least some operations of the audio/video processor and at least some responses to the inputs from the user.

\* \* \* \* \*